(12) United States Patent
Tinker et al.

(10) Patent No.: US 8,621,093 B2
(45) Date of Patent: Dec. 31, 2013

(54) NON-BLOCKING OF HEAD END INITIATED REVOCATION AND DELIVERY OF ENTITLEMENTS NON-ADDRESSABLE DIGITAL MEDIA NETWORK

(75) Inventors: Jeffrey Lee Tinker, Kenmore, WA (US); Charles Duncan MacLean, Claremont, CA (US); Hamid Shaheed Ali, Edmonds, WA (US); Edward Charles Hiar, Lynnwood, WA (US); Michael Rutman, Gainesville, FL (US); Glenn A. Morten, Bellevue, WA (US)

(73) Assignee: Google Inc., Mountain View, CA (US)

( * ) Notice: Subject to any disclaimer, the term of this patent is extended or adjusted under 35 U.S.C. 154(b) by 265 days.

(21) Appl. No.: 12/125,032

(22) Filed: May 21, 2008

(65) Prior Publication Data

US 2008/0294786 A1    Nov. 27, 2008

Related U.S. Application Data

(60) Provisional application No. 60/939,300, filed on May 21, 2007.

(51) Int. Cl.
*G06F 15/16*    (2006.01)

(52) U.S. Cl.
USPC ........... 709/229; 709/230; 709/232; 713/158; 725/29; 725/31

(58) Field of Classification Search
USPC ........ 709/229, 232, 230; 713/158; 725/29, 31
See application file for complete search history.

(56) References Cited

U.S. PATENT DOCUMENTS

| 4,535,355 A | 8/1985 | Arn et al. |
| 4,694,489 A | 9/1987 | Frederiksen |
| 5,067,035 A | 11/1991 | Kudelski et al. |
| 5,134,656 A | 7/1992 | Kudelski et al. |

(Continued)

FOREIGN PATENT DOCUMENTS

| EP | 658054 B1 | 6/1995 |
| EP | 714204 B1 | 5/1996 |

(Continued)

OTHER PUBLICATIONS

"Broadband Streaming Omneon and BSkyB," Omneon Video Networks, Product Announcement, TB-1006-1, 4 pages.

(Continued)

*Primary Examiner* — Anthony Mejia
(74) *Attorney, Agent, or Firm* — Frommer Lawrence & Haug LLP; John W. Branch

(57) ABSTRACT

A system, apparatus, and method are directed towards managing entitlement/right revocation and delivery to be performed within a non-addressable media network. Such networks may include for example a client device behind a network address translation (NAT) device, employs non-addressable satellite components, or so forth. A server notifies clients that entitlements, revocations, or the like are available by sending a request for communications with the client. The client initiates a connection to receive the entitlements, or the like, and then disconnects from the server. If the client fails to initiate a connection, the server may continue to send a request for a connection, or even change encryption keys to the content to prevent access by the client. In one embodiment, failure to receive an acknowledgement response from the server of a connection with the client, or from the client, may result in invocation of a revocation failure action.

21 Claims, 3 Drawing Sheets

(56) References Cited

U.S. PATENT DOCUMENTS

| Patent | Date | Inventor | Ref |
|---|---|---|---|
| 5,144,663 A | 9/1992 | Kudelski et al. | |
| 5,375,168 A | 12/1994 | Kudelski et al. | |
| 5,539,450 A | 7/1996 | Handelman et al. | |
| 5,590,200 A | 12/1996 | Nachman et al. | |
| 5,592,212 A | 1/1997 | Handelman et al. | |
| 5,621,799 A | 4/1997 | Katta et al. | |
| 5,640,546 A | 6/1997 | Gopinath et al. | |
| 5,666,412 A | 9/1997 | Handelman et al. | |
| 5,684,876 A | 11/1997 | Pinder et al. | |
| 5,758,257 A | 5/1998 | Herz et al. | |
| 5,774,527 A | 6/1998 | Handelman et al. | |
| 5,774,546 A | 6/1998 | Handelman et al. | |
| 5,799,089 A | 8/1998 | Kuhn et al. | |
| 5,805,705 A | 9/1998 | Gray et al. | |
| 5,870,474 A | 2/1999 | Wasilewski et al. | |
| 5,878,134 A | 3/1999 | Handelman et al. | |
| 5,883,957 A | 3/1999 | Moline et al. | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,625 A | 7/1999 | Davies et al. | |
| 5,920,861 A | 7/1999 | Hall et al. | |
| 5,922,208 A | 7/1999 | Demmers et al. | |
| 5,923,666 A | 7/1999 | Gledhill et al. | |
| 5,933,498 A | 8/1999 | Schneck et al. | |
| 5,939,975 A * | 8/1999 | Tsuria et al. | 340/426.18 |
| 5,943,422 A | 8/1999 | Van Wie et al. | |
| 5,949,876 A | 9/1999 | Ginter et al. | |
| 5,982,891 A | 11/1999 | Ginter et al. | |
| 5,991,399 A | 11/1999 | Graunke et al. | |
| 6,009,116 A | 12/1999 | Bednarek et al. | |
| 6,009,401 A | 12/1999 | Horstmann | |
| 6,009,525 A | 12/1999 | Horstmann | |
| 6,014,710 A * | 1/2000 | Talluri et al. | 709/237 |
| 6,021,197 A | 2/2000 | von Willich et al. | |
| 6,035,037 A | 3/2000 | Chaney | |
| 6,038,433 A | 3/2000 | Vegt et al. | |
| 6,049,671 A | 4/2000 | Slivka et al. | |
| 6,055,503 A | 4/2000 | Horstmann | |
| 6,073,256 A | 6/2000 | Sesma | |
| 6,112,181 A | 8/2000 | Shear et al. | |
| 6,138,119 A | 10/2000 | Hall et al. | |
| 6,157,721 A | 12/2000 | Shear et al. | |
| 6,178,242 B1 * | 1/2001 | Tsuria | 380/201 |
| 6,182,135 B1 * | 1/2001 | Ruane et al. | 709/224 |
| 6,185,683 B1 | 2/2001 | Ginter et al. | |
| 6,189,097 B1 | 2/2001 | Tycksen, Jr. et al. | |
| 6,191,782 B1 | 2/2001 | Mori et al. | |
| 6,226,794 B1 | 5/2001 | Anderson, Jr. et al. | |
| 6,237,786 B1 | 5/2001 | Ginter et al. | |
| 6,240,185 B1 | 5/2001 | Van Wie et al. | |
| 6,247,950 B1 | 6/2001 | Hallam et al. | |
| 6,253,193 B1 | 6/2001 | Ginter et al. | |
| 6,256,668 B1 | 7/2001 | Slivka et al. | |
| 6,272,636 B1 | 8/2001 | Neville et al. | |
| 6,285,985 B1 | 9/2001 | Horstmann | |
| 6,292,569 B1 | 9/2001 | Shear et al. | |
| 6,298,441 B1 | 10/2001 | Handelman et al. | |
| 6,314,409 B2 | 11/2001 | Schneck et al. | |
| 6,314,572 B1 | 11/2001 | LaRocca et al. | |
| 6,334,213 B1 | 12/2001 | Li | |
| 6,363,488 B1 | 3/2002 | Ginter et al. | |
| 6,389,402 B1 | 5/2002 | Ginter et al. | |
| 6,405,369 B1 | 6/2002 | Tsuria et al. | |
| 6,409,080 B2 | 6/2002 | Kawagishi et al. | |
| 6,409,089 B1 | 6/2002 | Eskicioglu | |
| 6,415,031 B1 | 7/2002 | Colligan et al. | |
| 6,427,140 B1 | 7/2002 | Ginter et al. | |
| 6,449,367 B2 | 9/2002 | Van Wie et al. | |
| 6,449,719 B1 | 9/2002 | Baker | |
| 6,459,427 B1 | 10/2002 | Mao et al. | |
| 6,466,670 B1 | 10/2002 | Tsuria et al. | |
| 6,505,299 B1 | 1/2003 | Zeng et al. | |
| 6,577,599 B1 * | 6/2003 | Gupta et al. | 370/236 |
| 6,587,561 B1 | 7/2003 | Sered et al. | |
| 6,618,484 B1 | 9/2003 | Van Wie et al. | |
| 6,629,243 B1 | 9/2003 | Kleinman et al. | |
| 6,634,028 B2 | 10/2003 | Handelman et al. | |
| 6,640,304 B2 | 10/2003 | Ginter et al. | |
| 6,651,170 B1 | 11/2003 | Rix et al. | |
| 6,654,420 B1 | 11/2003 | Snook et al. | |
| 6,654,423 B2 | 11/2003 | Jeong et al. | |
| 6,658,568 B1 | 12/2003 | Ginter et al. | |
| 6,661,778 B1 * | 12/2003 | Trofin et al. | 370/252 |
| 6,668,325 B1 | 12/2003 | Collberg et al. | |
| 6,775,703 B1 * | 8/2004 | Burns et al. | 709/228 |
| 6,892,219 B1 * | 5/2005 | Lerenc et al. | 709/203 |
| 6,898,637 B2 * | 5/2005 | Curtin | 709/231 |
| 7,266,080 B1 * | 9/2007 | Dispensa et al. | 370/230 |
| 7,392,381 B2 * | 6/2008 | Traw et al. | 713/158 |
| 7,430,181 B1 * | 9/2008 | Hong | 370/254 |
| 7,562,147 B1 * | 7/2009 | Cohen | 709/228 |
| 7,590,596 B2 * | 9/2009 | Koskinen et al. | 705/40 |
| 7,734,380 B2 * | 6/2010 | Ransom et al. | 700/286 |
| 7,801,134 B2 * | 9/2010 | Hori et al. | 370/390 |
| 7,831,515 B2 * | 11/2010 | Martinelli et al. | 705/59 |
| 7,844,691 B2 * | 11/2010 | Gopalakrishnan | 709/223 |
| 8,171,498 B2 * | 5/2012 | McInerney | 719/318 |
| 2002/0001385 A1 | 1/2002 | Kawada et al. | |
| 2002/0015498 A1 | 2/2002 | Houlberg et al. | |
| 2002/0021805 A1 | 2/2002 | Schumann et al. | |
| 2002/0049679 A1 | 4/2002 | Russetl et al. | |
| 2002/0089410 A1 | 7/2002 | Janiak et al. | |
| 2002/0091847 A1 * | 7/2002 | Curtin | 709/231 |
| 2002/0103758 A1 * | 8/2002 | Powell | 705/51 |
| 2002/0104004 A1 | 8/2002 | Couillard | |
| 2002/0141582 A1 | 10/2002 | Kocher et al. | |
| 2002/0174366 A1 * | 11/2002 | Peterka et al. | 713/201 |
| 2002/0198851 A1 * | 12/2002 | Hashimoto et al. | 705/400 |
| 2003/0007568 A1 | 1/2003 | Hamery et al. | |
| 2003/0018917 A1 | 1/2003 | Brown | |
| 2003/0115146 A1 * | 6/2003 | Lee et al. | 705/57 |
| 2003/0172270 A1 * | 9/2003 | Newcombe et al. | 713/168 |
| 2003/0233453 A1 * | 12/2003 | Lee | 709/225 |
| 2004/0044740 A1 * | 3/2004 | Cudd et al. | 709/217 |
| 2004/0068541 A1 * | 4/2004 | Bayassi et al. | 709/204 |
| 2004/0101138 A1 * | 5/2004 | Revital et al. | 380/210 |
| 2004/0138834 A1 * | 7/2004 | Blackett et al. | 702/62 |
| 2004/0143758 A1 * | 7/2004 | Swander et al. | 713/201 |
| 2004/0225693 A1 * | 11/2004 | Ganji et al. | 707/201 |
| 2004/0252691 A1 * | 12/2004 | Hori et al. | 370/390 |
| 2005/0120197 A1 | 6/2005 | Bons et al. | |
| 2005/0235163 A1 * | 10/2005 | Forlenza et al. | 713/193 |
| 2006/0004661 A1 * | 1/2006 | Bacon | 705/50 |
| 2006/0021065 A1 * | 1/2006 | Kamperman et al. | 726/28 |
| 2006/0031905 A1 * | 2/2006 | Kwon | 725/108 |
| 2006/0123246 A1 * | 6/2006 | Vantalon et al. | 713/189 |
| 2006/0167742 A1 * | 7/2006 | Bracken et al. | 705/10 |
| 2006/0168291 A1 * | 7/2006 | van Zoest et al. | 709/231 |
| 2006/0224711 A1 * | 10/2006 | Engel et al. | 709/223 |
| 2006/0242022 A1 * | 10/2006 | Hashimoto et al. | 705/14 |
| 2007/0061875 A1 * | 3/2007 | Le Buhan et al. | 726/10 |
| 2007/0180231 A1 * | 8/2007 | Morten et al. | 713/158 |
| 2007/0225986 A1 * | 9/2007 | Bowe et al. | 705/1 |
| 2007/0244832 A1 * | 10/2007 | Koskinen et al. | 705/68 |
| 2007/0289028 A1 * | 12/2007 | Vaughan et al. | 726/30 |
| 2009/0013039 A1 * | 1/2009 | Peng et al. | 709/203 |
| 2011/0033833 A1 * | 2/2011 | Blomquist et al. | 434/262 |
| 2011/0072157 A1 * | 3/2011 | Liu et al. | 709/242 |
| 2011/0145034 A1 * | 6/2011 | Moore | 705/7.17 |

FOREIGN PATENT DOCUMENTS

| | | |
|---|---|---|
| EP | 0886409 A2 | 12/1998 |
| WO | WO-96/06504 A1 | 2/1996 |
| WO | WO-96/32702 A1 | 10/1996 |
| WO | WO-99/30499 A1 | 6/1999 |
| WO | WO-99/54453 A1 | 10/1999 |
| WO | WO-01/35571 A1 | 5/2001 |
| WO | WO-01/93212 A2 | 12/2001 |
| WO | WO-02/21761 A2 | 3/2002 |

OTHER PUBLICATIONS

(56) References Cited

OTHER PUBLICATIONS

"Establishing Interconnectivity Among Various Makers' Products Through Standardization of VOD Protocol", NTT Corporation Press Release, Sep. 27, 2002. http://www.ntt.co.jp/news/news02e/0209/020927.html.

"Irdeto Access and Optibase Create Strategic Alliance—Dec. 14, 2000," Press Release, Irdeto Access, Dec. 14, 2000, 4 pages, http://www.irdetoaccess.conn/press/0000041.htm.

"Irdeto Access and Optibase Create Strategic Alliance", Press Release, Optibase, Dec. 14, 2000, 2 pages, http://www.optibase.com/html/news/December_14_2000.html (accessed Nov. 13, 2003).

"Riding the Media Bits Protecting content", chiariglione.org, Aug. 2003, 4 pages, http://chiariglione.org/ride/protecting_content/protecting_content.htm.

Bathrop, Justin, et al., "Coverage and Generalization in an Artificial Immune System", Proceedings of Genetic and Evolutionary Computation Conference (GECCO), pp. 1-8, 2002.

Blumenfeld, Steven M., "System Security," Broadcast Engineering magazine, Oct. 2001, 2 pages.

Cheng, Howard Chi Ho, "Partial Encryption for Image and Video Communication," Department of Computing Science, University of Alberta, Master's Thesis, Fall 1998, 87 pages.

Egevang, K. et al., "The IP Network Address Translator (NAT)," RFC 1631, May 1994, 10 pages.

Eskicioglu, A. et al., "An Overview of Multimedia Content Protection in Consumer Electronics Devices," Signal Processing: Image Communication, Apr. 2001, 16(7):681-699.

Forrest, S., "Research Projects," Dec. 2, 2003, 3 pages, http://www.cs.unm.edu/~forrest/projects.html.

Griwodz, Carsten, "Video Protection by Partial Content Corruption", Multimedia and Security Workshop at ACM Multimedia, Bristol, UK, pp. 1-5, Sep. 1998.

Hewitt, Rod, "TSReader—Analyze, Decode and Record MPEG-2 Transport Streams," Nov. 2003, 36 pages, http://www.coolstf.com/mpeg/.

Hunter, Jane et al., "A Review of Video Streaming Over the Internet," DSTC Technical Report TR97-10, Aug. 1997, 28 pages.

Intelligent Systems for Finance and Business, Goonatilake, Suran, ed. et al., 1995, chapters 2-10, pp. 31-173.

International Search Report and Written Opinion mailed Feb. 12, 2008, for International Patent Application No. PCT/US07/60274 (9 pages).

Schulzrinne, H., et al., "Real Time Streaming Protocol (RTSP)," RFC 2326, Apr. 1998, 86 pages.

Seiichi, Namba, "Technologies and Services on Digital Broadcasting (6): Scrambling (Conditional Access System)," Broadcast Technology, Autumn 2002, 12:10-13.

Spanos, George et al., "Performance Study of a Selective Encryption Scheme for the Security of Networked, Real-Time Video," Proceedings of the 4th International Conference on Computer Communications and Networks, Las Vegas, NV, Sep. 1995, pp. 2-10.

Wu, Tsung-Li et al., Selective Encryption and Watermarking of MPEG Video (Extended Abstract), International Conference on Image Science, Systems, and Technology, Sep. 1997, 10 pages.

Yoshida, Kazuhiro, et al., "A Continuous-media Communication Method for Minimizing Playback Interruptions," IS&T/SPIE Conference on Visual Communications and Image Processing, San Jose, California, Jan. 1999, SPIE vol. 3653, pp. 748-757.

\* cited by examiner

NON-BLOCKING OF HEAD END INITIATED REVOCATION AND DELIVERY OF ENTITLEMENTS NON-ADDRESSABLE DIGITAL MEDIA NETWORK

CROSS-REFERENCE TO RELATED APPLICATIONS

This application claims the benefit of U.S. Provisional Application Ser. No. 60/939,300 filed on May 21, 2007, entitled "Non-Blocking Of Head End Initiated Revocation And Delivery Of Entitlements In A Non-Addressable Digital Media Network," the benefit of the earlier filing date of which is hereby claimed under 35 U.S.C. §119 (e) and 37 C.F.R. §1.78, and is further incorporated herein by reference.

BACKGROUND

The present invention relates generally to digital copy protection, digital right management, and conditional access, and more particularly but not exclusively to managing revocation of an entitlement or right to access a file within networks that include non-addressable client devices.

Recent advances in the telecommunications and electronics industry, and, in particular, improvements in digital compression techniques, networking, and hard drive capacities have led to growth in new digital services to a user's home. For example, such advances have provided hundreds of cable television channels to users by compressing digital data and digital video, transmitting the compressed digital signals over conventional coaxial cable television channels, and then decompressing the signals in the user's receiver. One application for these technologies that has received considerable attention recently includes video-on-demand (VOD) systems where a user may communicate with a service operator to request media content and the requested content is routed to the user's home for enjoyment. The service operator typically obtains the content from an upstream content provider, such as a content owner, distributor, or the like.

To protect content from unauthorized use, service operators, content providers, owners, and so forth, may employ a service known as conditional access or digital rights management. Conditional access or digital rights management enables a provider to restrict access of selected content to selected users. This may be achieved, for example by encrypting the content.

One such encryption approach employs a technique that provides a message known as an Entitlement Control Message (ECM). The ECM is typically a packet which includes information to determine a control word (CW) for use in decrypting the content. In this approach, streaming content may be encrypted using the CW. The CW may be encrypted with a service key via the ECM message. The encrypted content, including the ECM may then be provided to a user.

The service key may also be encrypted using an encryption key that may be specific to a user, and sent to the user within a message frame, packet, or the like. For example, the service key may be sent within an Entitlement Management Message (EMM). The EMM may also include additional information such as subscription information, or the like, associated with a user. For example, the EMM may include information that indicates whether the user has a right to access the decrypted content, possible constraints upon the access, or whether such access right is revoked.

However, in many digital network environments today, network address translation (NAT) devices are being employed. Typically, the use of such NAT devices tends to obscure the complexity of one network from another network. By employing a NAT device, the hidden components protected by the NAT device need not reveal their network addresses to a global address space. Therefore, it may be difficult to communicate with the hidden components, unless that component initiates a connection with a device outside of the protection of the NAT device. Such configuration, however, may provide an obstacle to the traditional operation of conditional access services, as the service may be unable to communicate with the hidden component to provide entitlements, rights, or even to revoke such entitlements or rights. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Figure 1:
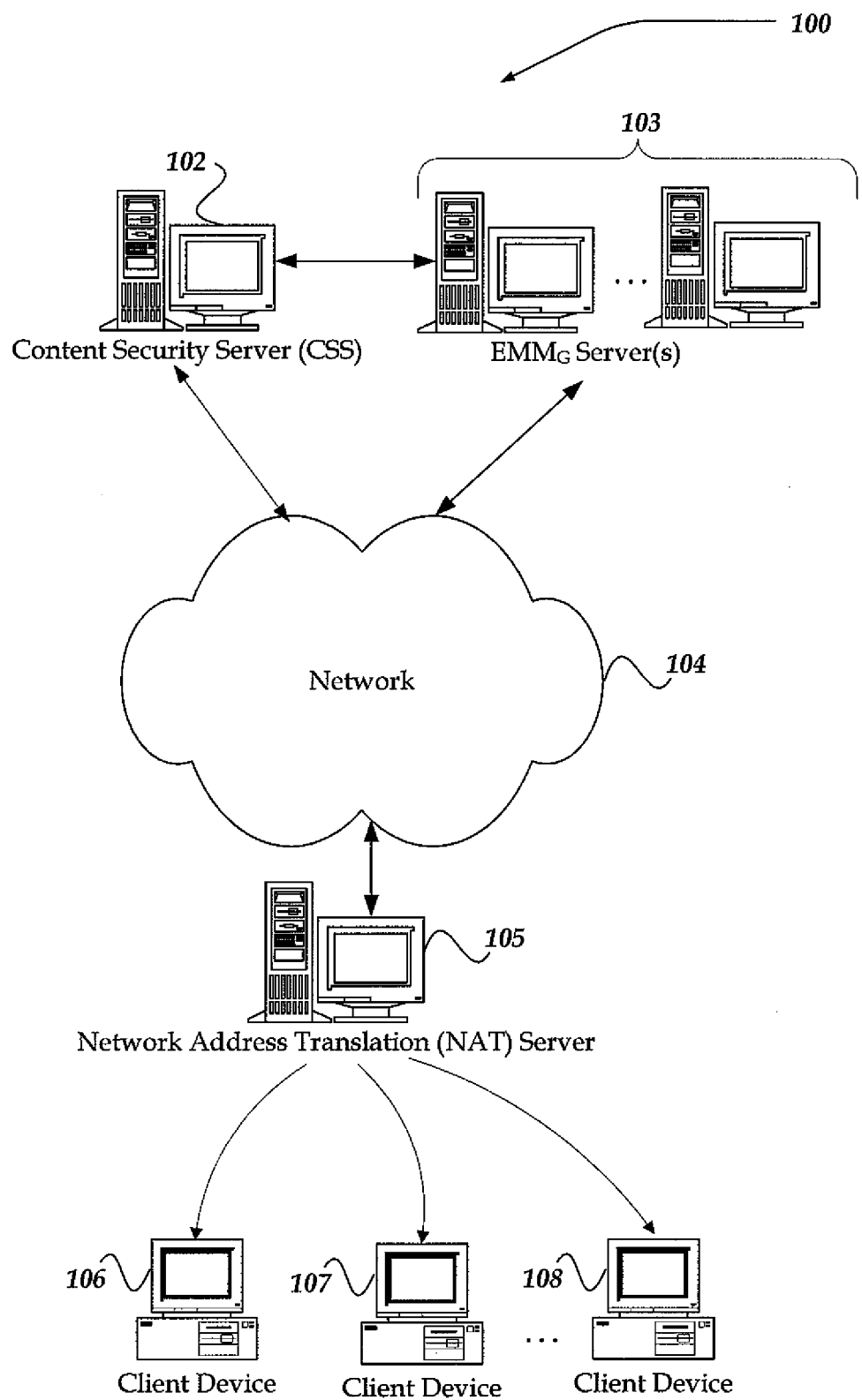
FIG. 1 shows a functional block diagram illustrating one embodiment of an environment for practicing the invention.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, the present invention is directed towards a system, apparatus, and method for managing entitlement/ right revocation and delivery to be performed within a non-addressable media network. Such networks may include for example a client device behind a network address translation (NAT) device, filtering gateways, behind non-addressable satellite components, or so forth. A server notifies clients that entitlements, revocations, or the like are available by sending a request for communications with the client. The client initiates a connection to receive the entitlements, or the like, and then disconnects from the server. If the client fails to initiate a connection, the server may continue to send a request for a connection, or even change encryption keys to the content to prevent access by the client. In one embodiment, failure to receive an acknowledgement response from the server of a connection with the client, or from the client, may result in invocation of a revocation failure action. In one embodiment, a positive acknowledgement receipt might be expected from the client device using a mechanism such as described in co-pending patent application Ser. No. 11/344,321, entitled "Preventing Entitlement Management Message (EMM) Filter Attacks," filed Jan. 31, 2006, which is incorporated herein by reference. However, the invention is not limited as to any particular acknowledgment message implementations, and any of a variety of mechanisms may be used to generate and/or provide a message useable to acknowledge receipt of connection with and/or receipt of entitlements, revocations, or the like.

Illustrative Environment

FIG. 1 shows a functional block diagram illustrating one embodiment of operating environment 100 in which the invention may be implemented. Operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes Content Security Server (CSS) 102, EMM Gateway ($EMM_G$) servers 103, network 104, NAT server 105, and client devices 106-108. Network 104 is in communications with and enables communication between CSS 102 and NAT server 105. NAT server 105 is in communication with and enables communication between network 104 and client devices 106-108. CSS 102 is also in communication with $EMM_G$ servers 103.

CSS 102 includes virtually any network device configured for use by producers, developers, distributers, aggregator, service operators, and/or owners of media content that can be distributed to client devices 106-108. Such content, includes, but is not limited to motion pictures, movies, videos, music, PPV, VoD, interactive media, audios, still images, text, graphics, and other forms of digital content directed towards a user of a client device, such as client devices 106-108, or the like. CSS 102 may also include businesses, systems, or the like that obtain rights from a content owner to copy and distribute the content. CSS 102 may obtain the rights to copy and distribute from one or more content owners. CSS 102 may repackage, store, and schedule content for subsequent sale, distribution, and license to other content providers, users of client devices 106-108, or the like.

CSS 102 may provide the content over network 104 to client devices 106-108, or the like. CSS 102 may provide the content using any of a variety of mechanisms. The term "content" as used herein refers to any form of digital data, including, but not limited to motion pictures, movies, videos, music, pay per view (PPV), video-on-demand (VOD), interactive media, audios, still images, text, graphics, and other forms of digital data usable by a computing device. However, content is not limited to these examples, and virtually any form or type of digital data may be included, without departing from the scope of the invention. Furthermore, the term content refers to the digital data and is independent of its format. However, in one embodiment, the content is provided as a Moving Pictures Experts Group (MPEG) content stream, such as a transport stream, or the like. However, the invention is not so limited, and other file formats may also be employed, without departing from the scope or spirit of the invention. For example, the invention may be configured to employ, without limitation, at least Flash video files (.FLV), Shockwave Flash (.SWF) files, H.263, H.264, Windows Media, Quick Time (QT), Real, or virtually any other file format, streaming format, or the like.

Briefly, MPEG is an encoding and compression standard for digital broadcast content. MPEG provides compression support for television quality transmission of video broadcast content. Moreover, MPEG provides for compressed audio, control, and even user broadcast content. One embodiment of MPEG-2 standards is described in ISO/IEC 13818-7 (available through the Organisation internationale de Normalisation), which is hereby incorporated by reference.

MPEG content streams may include Packetized Elementary Streams (PES), which typically include fixed (or variable sized) blocks or frames of an integral number of elementary streams (ES) access units. An ES typically is a basic component of an MPEG content stream, and includes digital control data, digital audio, digital video, and other digital content (synchronous or asynchronous). A group of tightly coupled PES packets referenced to substantially the same time base comprises an MPEG program stream (PS). Each PES packet also may be broken into fixed-sized transport packet known as MPEG Transport Streams (TS) that form a general-purpose approach of combining one or more content streams, possible including independent time bases, Moreover, MPEG frames may include intra-frames (I-frames), forward predicted frames (P-frames), and/or bi-directional predicted frames (B-frames).

CSS 102 may also enable scrambling and/or encryption of the content to minimize the likelihood that non-subscribers from enjoying the content. CSS 102 may also manage access control messages to determine whether descrambling and/or decrypting of the content is to be performed. In one embodiment, CSS 102 may employ ECM and/or EMM messages to manage conditional access to the scrambled content. However, the invention is not so limited, and other forms of access control messages, or mechanisms, may also be employed without departing from the scope or spirit of the invention.

CSS 102 may provide access control messages that either enable access to content, or restricts access of content. For example, in one embodiment, CSS 102 may provide an access control message, such as a revocation EMM, or the like, that removes access rights to particular content. In one embodiment, the revocation EMM may include a message indicating that an entitlement or right to access particular content is revoked for the client. In one embodiment, CSS 102 may provide the control messages, such as EMMs, revocation EMMs, or the like, to $EMM_G$ servers 103 to be managed.

One embodiment of an $EMM_G$ server 103 is described in more detail below in conjunction with FIG. 2. Briefly, however, $EMM_G$ servers 103 include virtually any network device configured employ a message service for use within a context of a conditional access system. In one embodiment, $EMM_G$ servers 103 may employ a broadcast communication protocol for communicating messages to devices, such as client devices 106-108. However, the invention is not restricted to use of broadcast communication protocols, and other protocols may also be employed.

In one embodiment, however, $EMM_G$ servers 103 may operate as a multicast service for conditional access messages. In one embodiment, $EMM_G$ servers 103 may not impose any formats or content restrictions on the data that is delivered. In one embodiment, the channel format and/or content may be determined by a configuration and/or data file which may be statically created and/or maintained by an administrator, or dynamically generated by another mechanism, such as through CSS 102, or the like.

As illustrated, $EMM_G$ servers 103 are shown as multiple network devices. Such arrangement may represent failover configurations, and/or geographically distributed services. Thus, for example, one of $EMM_G$ servers 103 might manage communications with client devices in one designated geographic region, while another of $EMM_G$ servers 103 might manage communications with client devices in another designated geographic region. However, the invention is not so limited, and other arrangements are also envisaged. For example, one of $EMM_G$ servers 103 might be configured to communicate with client devices behind a particular NAT or NATs, while another one of $EMM_G$ servers 103 might be configured to communicate with client devices behind another particular NAT or NATs. Thus, FIG. 1 is not intended to restrict, or otherwise narrow the invention, and other arrangements are also possible, without departing from the scope of the invention.

$EMM_G$ servers 103 may broadcast administrative information on a reserved multicast address to clients 106-108, including CSS address information, $EMM_G$ servers 103 address information, global time, service channel mappings, and/or entitlement availability notifications. In one embodiment, $EMM_G$ servers 103 may multicast notifications to clients 106-108 when a conditional access message, such as EMM, revocation messages, and/or other control messages are available. It is anticipated that clients 106-108 will then initiate a connection to one of $EMM_G$ servers 103, download the conditional access message, including any entitlements, revocations, or the like, and then immediately, or shortly thereafter, disconnect after the available messages are received by the client. In one embodiment, the client device may disconnect after all of the message available are received. In another embodiment, the client device might disconnect and/or reconnect more than once to receive the available messages. $EMM_G$ servers 103 may then notify CSS 102 when it has sent the messages successfully to clients 106-108. In one embodiment, $EMM_G$ servers 103 may perform a defined number of retries to notify clients 106-108 of an availability of conditional access messages.

In one embodiment, when a client connects and downloads the conditional access messages from $EMM_G$ servers 103, $EMM_G$ servers 103 may remove the client device(s) from a multicast list, effectively acknowledging receipt of the conditional access messages. In one embodiment, $EMM_G$ servers 103 may seek to receive a positive acknowledgement receipt from the client devices 106-108 to indicate that the conditional access messages have been received. One implementation of using positive acknowledgement receipt, for such as revocation EMMs, or the like, is described in more detail in co-pending patent application Ser. No. 11/344,321, entitled "Preventing Entitlement Management Message (EMM) Filter Attacks," filed Jan. 31, 2006, which is incorporated herein by reference. For example, in one embodiment, the client devices 106-108 may be configured to provide an acknowledgement message that is secured using a digital signature associated with the client device, subscriber, or the like. In another embodiment, the acknowledgement message may include a nonce, hash, encrypted authentication message, or the like, to ensure that the client device is not spoofed, or otherwise hacked. Such nonces, hashes, authentication message, or the like, may have been sent to the client device by $EMM_G$ servers 103 or CSS 102. For example, in one embodiment, $EMM_G$ servers 103 might send a nonce, hash, authentication message or the like, to the client device, which then might encrypt and/or digitally sign the nonce, hash, authentication message, or the like, and return it to $EMM_G$ servers 103.

If, after a predetermined number of retry attempts, a valid acknowledgement is not received, the $EMM_G$ servers 103 may perform various failure actions. Such failure actions may include sending an alert message to CSS 102 such that it may change encryption keys such as the CW, the service key, or the like, for future content delivery to limit the usefulness of existing keys delivered to the user. In one embodiment, the failure action may also include determining whether a network, client device, NAT service, or the like, is failed. For example, a possible reason for failure to receive the acknowledgement may be associated with a network failure between the NAT 105, $EMM_G$ servers 103, or the like. Thus, in one embodiment, the invention may also be employed provide an alert regarding possible network and/or device failures.

Moreover, $EMM_G$ servers 103 may store information about acknowledgement failures in a data store, such as a Forensic data store, or the like. $EMM_G$ servers 103, or another network device, may then employ the stored information for a variety of actions, including, but not limited to performing trend analysis; enabling legal actions to commence based at least in part on the stored information; as noted above, enabling diagnosis of a network or other communication path to be performed; enabling network reliability analysis be performed; tuning of a retry mechanism; or the like.

It should be noted that the invention is not constrained to the above distribution of functions. Thus, for example, in one embodiment, $EMM_G$ servers 103 may be configured to provide notifications of an availability of conditional access messages, which may then be obtained from another network device. The other network device may include CSS 102, or yet another network device (not shown). For example, in one embodiment, $EMM_G$ servers 103 might provide notifications of an availability of messages to client devices, with an additional request that the client devices further communicate the notification to other client devices using a mechanism similar to a peer-to-peer messaging mechanism, or the like. $EMM_G$ servers 103 may then perform monitoring to determine whether a client device has acknowledged receiving of the conditional access messages, and if not then either perform retry notifications of the availability of the messages, or perform a failure action.

As shown in system 100, $EMM_G$ servers 103 are illustrated as a plurality of servers. Although not required, in one embodiment, such configuration may enable implementation of load balancing mechanisms directed towards providing distribution of client communication loads, protection against failovers, or the like.

Devices that may operate as CSS 102 and/or $EMM_G$ servers 103 include personal computers, desktop computers, multiprocessor systems, network appliance, microprocessor-based or programmable consumer electronics, network PCs, servers, or the like.

Although CSS 102 and $EMM_G$ servers 103 are illustrated as distinct servers, the invention is not so limited. Thus, the functionality of CSS 102 and $EMM_G$ servers 103 may also be implemented within a single network device, or distributed over more than two network devices. For example, as illustrated below in conjunction with FIG. 2, the functionality of CSS 102 and EMM$_G$ servers 103 are implemented within a single network device.

Network 104 is configured to couple one computing device to another computing device to enable them to communicate. Network 104 is enabled to employ any form of computer readable media for communicating information from one electronic device to another. Also, network 104 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 104 includes any communication method by which information may travel between client devices 106-108 and/or CSS 102.

Moreover, network 104 may represent a plurality of different components, and/or network paths between CSS 102 and client devices 106-108. Thus, content and/or other information provided by CSS 102 to client devices 106-108 may employ at least in part a different network component and/or path than information provided by client devices 106-108 to CSS 102. For example, CSS 102 may provide content, including ECMs, and/or EMMs to client devices 106-108 over a satellite link, while client devices 106-108 may provide information to CSS 102 using a wired link, a telephone dial-up component, or the like. However, the invention is not so limited, and CSS 102 and client devices 106-108 may also employ virtually the same network 104 components, protocols, and/or mechanisms with which to communicate information, and/or a variety of other paths, components, or the like.

CSS 102 is not limited to providing content, and/or ECMs, and/or EMMs to client devices 106-108 over network 104, however. For example, CSS 102 may also employ a variety of other portable content storage devices, including, but not limited to Digital Versatile Discs (DVDs), High Definition DVD (HD-DVD), Compact Discs (CDs), Video Compact Disc (VCD), Super VCD (SVCD), Super Audio CD (SACD), Dynamic Digital Sound (DDS) content media, Read/Write DVD, CD-Recordable (CD-R), Blu-Ray discs, or the like. Moreover, CSS 102 may provide content using, for example, a portable content storage device, while providing the ECMs, EMMs, including, possibly a revocation EMM, to EMM$_G$ servers 103, without departing from the scope or spirit of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

NAT server 105 operates as NAT service, such as described in Request For Comments (RFC) 1631, which is available through the Internet Engineering Task Force (IETF), and is herein incorporated by reference. Briefly, however, provides IP address translations allowing a single device, such as a router, gateway, or the like, to act as an agent between the Internet (such as network 104) and a local (private) network, enabling a single, unique IP address to represent a plurality of devices, such as client devices 106-108. NAT server 105, as shown, may be placed at a border of stub domains, or the like, where a stub domain is a network domain, such as a corporate network LAN, VLAN, or other network partitioning. When a NAT is employed, the IP address space is typically partitioned into at least two parts—a reusable set of IP addresses internal (behind NAT server 105) and a set of globally unique IP address. The reusable IP addresses are typically called internal local IP address, or local addresses. The global IP addresses are termed global addresses or outside global addresses. The local addresses are typically not accessible to network devices outside of the NAT server 105's domain. Moreover, client devices behind NAT server 105 may further employ mechanisms such as Dynamic Host Configuration Protocols (DHCP), or the like, resulting in dynamic local addressing. Such actions may further result in difficulty in an outside device initiating a communication with a hidden client device behind NAT server 105.

It should be noted that the invention is not constrained to usage merely in situations where a NAT network device may reside. For example, the invention may be used in virtually any situation where a client device's network address may not be directly accessible for initiating communications with the client device. Such may arise due to any of a variety of filtering mechanisms, network partitioning mechanisms, or the like.

Devices that may operate as NAT server 105 include personal computers, desktop computers, multiprocessor systems, network appliance, microprocessor-based or programmable consumer electronics, network PCs, servers, or the like.

Client devices 106-108 may include virtually any computing device capable of receiving content over a network, such as network 104, from another computing device, such as CSS 102, EMM$_G$ servers 103, or the like. As shown, client devices 106-108 typically perform such communications with the other devices through NAT server 105.

Client devices 106-108 may also include any computing device capable of receiving the content employing other mechanisms, including, but not limited to CDs, DVDs, tape, electronic memory devices, or the like. The set of such devices may include devices that typically connect using a wired communications medium such as personal computers, multiprocessor systems, microprocessor-based or programmable consumer electronics, network PCs, or the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or the like. Client devices 106-108 may also be any device that is capable of connecting using a wired or wireless communication medium such as a PDA, POCKET PC, wearable computer, and any other device that is equipped to communicate over a wired and/or wireless communication medium to receive and play content. Similarly, client devices 106-108 may employ any of a variety of devices to enjoy such content, including, but not limited to, a computer display system, an audio system, a jukebox, set top box (STB), a television, video display device, or the like.

Client devices 106-108 may include a client that is configured to enable an end-user to receive content and to play the received content. The client may also provide other actions, including, but not limited to, enabling other components of the client device to execute, enable an interface with another component, device, the end-user, or the like.

Client devices 106-108 may receive the content as scrambled/encrypted and employ a conditional access control component to decrypt content, and/or enable revocation of an access entitlement and/or right associated with content. For example, client devices 106-108 may receive content decryption keys, service keys, entitlements and/or rights, or the like. Moreover, client devices 106-108 may employ a smart card, such as a virtual smart card, or the like, to manage access to and decryption of the content.

In one embodiment, client devices 106-108 may further provide an acknowledgement of receipt of an access control message, including an access revocation message, or the like. For example, client devices 106-108 or a component associated with client devices 106-108 may receive a revocation message, revoke the access entitlement/right or license to the content, and in response, further provide an acknowledgement message. In one embodiment, the acknowledgement message may be secured using a variety of mechanisms. Client devices 106-108 may provide the acknowledgement message to $EMM_G$ servers 103, CSS 102, or the like, using network 104.

Illustrative Server Environment

Figure 2:
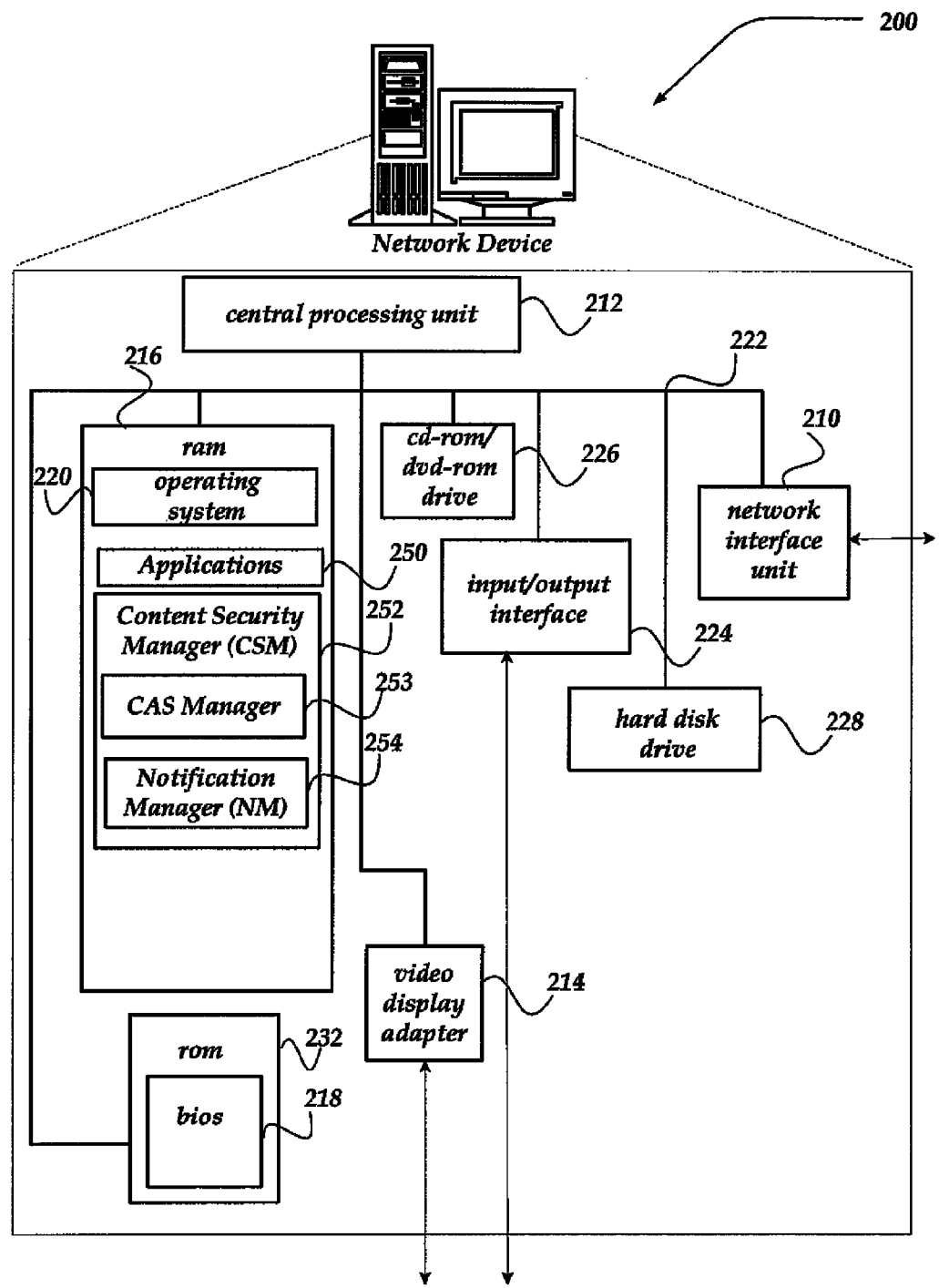
FIG. 2 shows one embodiment of a network device that may be included in a system implementing the invention.

FIG. 2 shows one embodiment of a network device, according to one embodiment of the invention. Network device 200 may include many more components than those shown. The components shown, however, are sufficient to disclose an illustrative embodiment for practicing the invention. Network device 200 may, for example, represent a combined device usable for CSS 102 and $EMM_G$ servers 103 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol. Network interface unit 210 is sometimes known as a transceiver, transceiving device, network interface card (NIC), or the like.

Network device 200 may also include an SMTP handler application for transmitting and receiving email. Network device 200 may also include an HTTP handler application for receiving and handing HTTP requests, and an HTTPS handler application for handling secure connections. The HTTPS handler application may initiate communication with an external application in a secure fashion.

Network device 200 also may include input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 is utilized by network device 200 to store, among other things, application programs, databases, or the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, transcoders, database programs, word processing programs, spreadsheet programs, and so forth. Mass storage may further include applications such Content Security Manager (CSM) 252, which is configured to manage conditional access to content by a user over a network. CSM 252 may include CAS manager 253, and Notification Manager (NM) 254.

CAS manager 253 may be configured to scramble/encrypt content using any of a variety of encryption mechanisms to generate encrypted content, including, but not limited, to RSA algorithms, Data Encryption Standard (DES), International Data Encryption Algorithm (IDEA), Skipjack, RC4, Advanced Encryption Standard (AES), Elliptic Curve Cryptography, or the like.

CAS manager 253 may also selectively encrypt at least a portion of the content leaving another portion unencrypted (e.g., in the clear). CAS manager 253 may selectively encrypt one portion of the content using one encryption technique, and another portion of the content using a different encryption technique. CAS manager 253 may further employ different content encryption keys (CWs) for different portions of the selectively encrypted content.

CAS manager 253 may select to encrypt a video elementary stream (ES), an audio ES, a digital data ES, and/or any combination, and/or any portion of video, audio, data elementary streams to generate encrypted content. CAS manager 253 may further select to encrypt at least a portion of an I-frame, P-frame, B-frame, and/or any combination of P, B, and I frames. Moreover CAS manager 253 may perform such encryption on-the-fly. However, CAS manager 253 may also provide encryption prior to sending of the content.

CAS manager 253 may also send place CWs into ECMs, and/or service keys within EMMs. CAS manager 253 may also, based on a variety of reasons, insert a revocation of access entitlements/rights of content into an EMM. CAS manager 253 may employ MPEG or another mechanism to prepare and provide the content, ECMs, and/or EMMs to a client device.

It should be noted, however, that the invention is not constrained to using EMMs to send an entitlement/right and/or to revoke an entitlement/right to content. For example, in one embodiment, CAS manager 253 may also employ an Access Control List (ACL) to provide access rights to the content. For example, the ACL may be used to validate and/or invalidate a digital certificate in a public key infrastructure, or the like, and thereby provide access right determinations to the content.

In one embodiment CAS manager 253 may provide to NM 254 information regarding an availability of such EMMs, or other conditional access messages that are to be sent to a client device. NM 254 may then be configured to notify client devices when a new entitlement, revocation, countermeasure messages, or other conditional access message is available for the client device. NM 254 may then, in one embodiment, broadcast administrative information on a reserved multicast address to the client devices. However, the invention is not so limited, and other protocols may also be used. In one embodiment, the conditional access messages may be sent to a NAT device, such as NAT server 105 of FIG. 1, to be distributed to client devices 106-108 of FIG. 1. However, other network address obscuring devices may also be used instead of, or in addition to, a NAT device.

In one embodiment, NM 254 may send a notification that the conditional access messages are available for the client device. In one embodiment, the notification may include a request for the client device to initiate a connection with network device 200, or the like. Instead of being continuously connected to network device 200, or the like, client devices may be requested to initiate connections when such notifications are received. When the client devices receive the notification, they are expected to initiate a network connection with network device 200, or the like, and to download the entitlements, and/or other conditional access messages. In one embodiment, the client devices may then disconnect from network device 200, or the like. NM 254 may then acknowledge, in one embodiment, CAS Manager 253 that the client devices have received all of the available conditional access messages. In one embodiment, NM 254 may also monitor for a positive acknowledgement from each of the client devices that the conditional access messages have been received. When such acknowledgements have been received, NM 254 may then remove the client device from a multicast list of devices to receive the messages. In one embodiment, NM 254 may provide a predefined number of retries to notify a client device to connect and download the conditional messages. In one embodiment, after the number of retries is exceeded, without an acknowledgment that the client device has received the conditional messages, NM 254 may perform one or more failure actions.

For example, if, after a predetermined number of retry attempts, a valid acknowledgement is not received, the NM 254 may send an alert message to a content owner, or the like, direct CAS Manager 253 to change encryption keys such as the CW, the service key, or the like, or perform any of a variety of other failure actions. In one embodiment, as noted above the failure action may also include determining whether a network, NAT service, or the like, is failed. NM Manager 254 may employ a process substantially similar to process 300 described below in conjunction with FIG. 3 to perform at least some of its actions.

It should be noted, that NM 254 may also include information about network addresses to CAS Manager 253, and/or other network devices to enable a client device to communicate with components within the conditional access system. Moreover, CAS Manager 253 may also include such information. In this manner, the functionality of network device 200 with respect to CSM 252's components may be distributed across a plurality of network devices, such as in a federated configuration, or the like. This distribution may then enable dynamic load balancing and/or failover protection for client devices among a cluster of CAS components, including, for example CSS 102, and/or $EMM_G$ servers 103 of FIG. 1. In addition, multicasting services may be expanded to provide for a number of other services, including secure multicasting of upgrades to the client devices, or the like.

Generalized Operation

Figure 3:
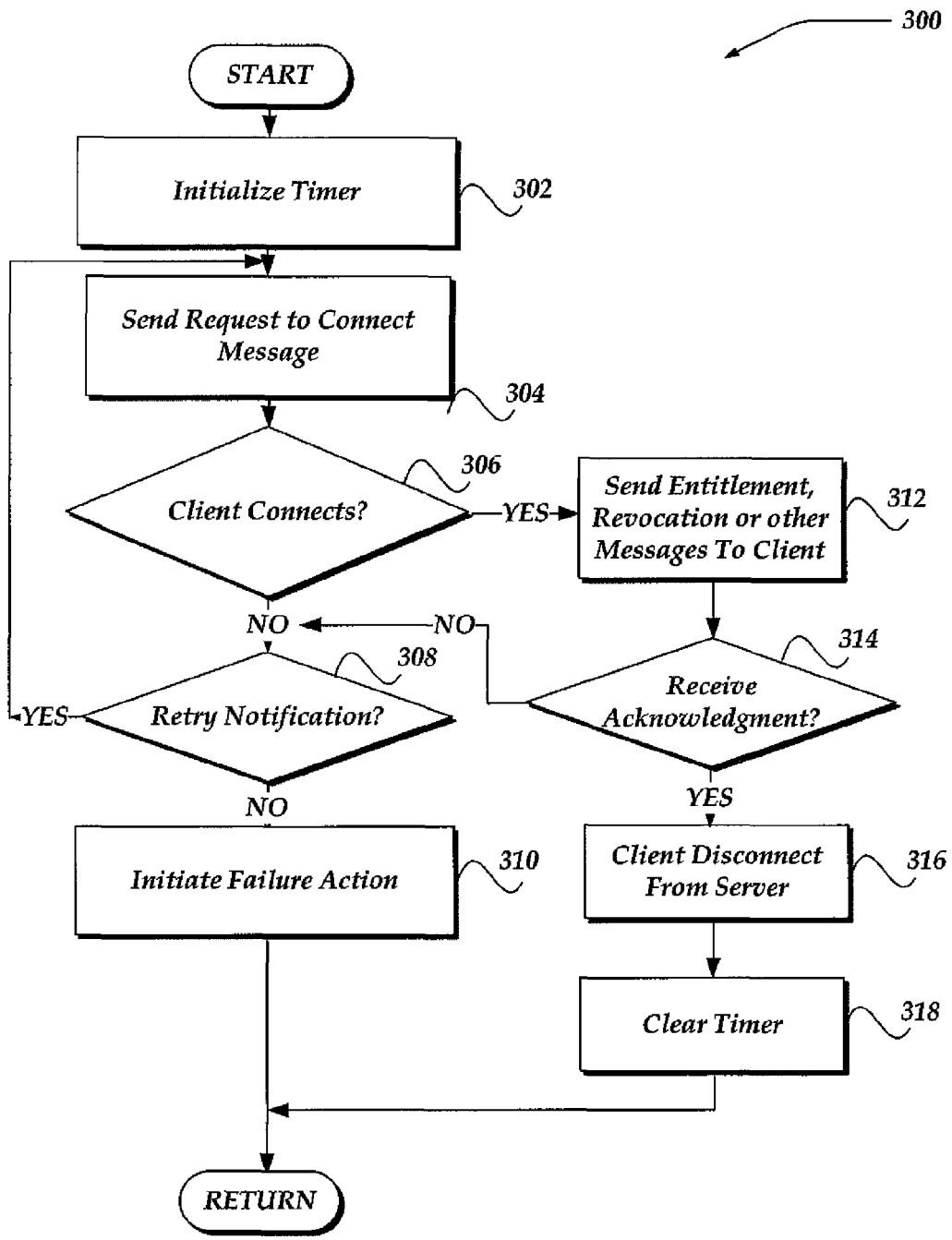
FIG. 3 illustrates a flow diagram generally showing one embodiment of a process flow for managing revocation and delivery of entitlements in a non-addressable network for conditional access to secure content, in accordance with the present invention.

The operation of certain aspects of the invention will now be described with respect to FIG. 3. FIG. 3 illustrates a flow diagram generally showing one embodiment of a process flow for managing revocation and delivery of entitlements in a non-addressable network for conditional access to secure content.

As shown, process 300 of FIG. 3, begins after a start block, at block 302, where a timer may be initialized. In one embodiment, a timer may be employed to limit an amount of time in which a client device may be given in which to respond to a notification message that conditional access messages are available.

The timer may be set to any of a variety of values based a factors, including, but not limited to, a network characteristic, a relationship to a number of retries to be allowed, an urgency, or the like. For example, the time period may be set to a value between about 5 seconds to about 25 seconds. Shorter time periods may be employed, for example, where a network characteristic indicates that notification messages may be received over a high-speed network link. Longer time periods may be used, for example, where the notification messages may be received over a low-speed network link, such as a dial-up, or the like. However, the invention is not so limited to this approach, and other characteristics, such as round trip times (RTT), or the like, also may be employed to determine a time period. Moreover, historical failure data may be used to tune such time periods for a particular client, client collection, sub-network, or the like.

In any event, processing flows next to block 304, where the notification message may be sent to the client device. In one embodiment, the notification message is multicast using a broadcast communication protocol. However, the invention is not so limited, and other communication protocols may also be employed.

Moreover, it should be clear that while it is illustrated that the timer is initiated prior to sending the notification message, the invention is not so constrained. For example, the timer may be initiated at substantially the same time the notification message is sent, or even subsequent to sending the notification message, without departing from the scope or spirit of the invention.

Processing then flows to decision block 306, where a determination is made whether the client device has successfully initiated a connection to request a download of the conditional access messages based on the notification message. If so, processing flows to block 312; otherwise, processing flows to decision block 308.

At block 312, the conditional access messages, including entitlements, revocation messages, or the like, that are available are downloaded by the client device. Processing continues to decision block 314, where a determination is made whether an acknowledgement is received indicating that the client device has successfully downloaded the available conditional access messages. In one embodiment, the client device may send an acknowledgment message indicating receipt of the conditional access messages. In another embodiment, once the messages have been have been requested by the client device a server may perform an acknowledgement action. In one embodiment, the server may send an acknowledgement message. In another embodiment, the server may remove the client device's identifier from a list thereby acknowledging a successful download. However, other mechanisms may also be employed to indicate that a client device has successfully initiated a connection and downloaded the available conditional access messages. In any event, if an acknowledgment is not received, processing branches to decision block 308; otherwise, processing continues to block 316.

At block 316, where the client device disconnects from the download service. Process 318 may then flow to block 318, where the timer for the client device is then cleared. Processing may then return to a calling process to perform other actions.

Alternatively, if at decision block 308 it is determined that the client has not successfully initiated a network connection to obtain the conditional access messages within the time period, processing continues to decision block 308.

At decision block 308, a determination is made whether to retry sending the notification message indicating that the conditional access messages are available. This determination may be based on exceeding the time period, for example. In one embodiment, however, even if the time period is not exceeded, the determination may be further based on a variety of other criteria, including, but not limited to exceeding a number of retry attempts, receiving an indication that a network failure has occurred, or the like. In any event, if a notification is to be resent, processing may loop back to block 304; otherwise, processing continues to block 310.

At block 310, it has been determined that the client device has not successfully connected and downloaded the conditional access messages that are available. Therefore, a determined failure action may be performed. Such failure action may include, but is not limited to providing an alert message to direct another system to determine whether a networking failure and/or network device failure has occurred. Such determination may be performed using any of a variety of mechanisms, including, performing a network ping, or similar network analysis action, sending an individual out to investigate the network and/or devices, sending a message to the user associated with the end client device, or the like. In one embodiment, the failure action may include changing one or more encryption keys, service keys, digital certificates, or the like, associated with content to be sent over the network. Process 300 then returns to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device for managing access to content over a network, comprising:
   a transceiver for receiving and sending information over the network; a processor in communication with the display and the transceiver; and
   a memory in communication with the processor and for use in storing data and machine instructions that causes the processor to perform a plurality of actions, including:
   broadcasting a notification to a client device indicating an availability of an entitlement or revocation message;
   determining a time period for the client device to respond to the notification, wherein a length of the time period is based on at least one of a network characteristic, an urgency of the notification, or a round trip time (RTT) for communication between the network device and the client device;
   tuning the length of the time period for the client device to respond based at least on historical failure data;
   in response to the broadcast notification the client device initiates a connection with the network device prior to expiration of the time period, sending the entitlement or revocation message by the network device to the client device over the connection initiated by the client device, and disconnecting from the client device;
   in response to the receipt of the entitlement or revocation message is positively acknowledged, removing the client device from a multicast list of client devices;
   in response to the client device fails to initiate a connection to receive the message within the time period, performing at least one retry attempt comprising sending another request for a connection; and
   in response to after the at least one retry attempt the client device fails to initiate a connection within at least another time period, performing a revocation failure action.

2. The network device of claim 1, wherein the revocation failure action further comprises performing at least one of changing an encryption/decryption key associated with the secure content, or a service key.

3. The network device of claim 1, wherein sending the notification further comprises sending a notification using a broadcasting protocol.

4. The network device of claim 1, wherein the revocation failure action further comprises performing a network failure detection analysis.

5. The network device of claim 1, wherein the entitlement message or the revocation message is sent within an Entitlement Management Message (EMM).

6. The network device of claim 1, wherein the client device resides behind a network address translation device (NAT).

7. The network device of claim 1, wherein historical acknowledgment failure data is used to adjust at least one of the time period or the other time period.

8. The network device of claim 1, wherein the notification to the client device indicating the availability of the entitlement or revocation message is broadcasted to a plurality of client devices.

9. A non-transitory computer-readable storage medium that includes data and instructions, wherein the execution of the instructions on a computing device provides for managing access to content over a network by enabling actions, comprising:
 broadcasting a notification to a client device indicating an availability of an entitlement or revocation message;
 determining a time period for the client device to respond to the notification, wherein a length of the time period is based on at least one of a network characteristic, an urgency of the notification, or a round trip time (RTT) for communication between the network device and the client device;
 tuning the length of the time period for the client device to respond based at least on historical failure data;
 in response to the broadcast notification the client device initiates a connection with the network device prior to expiration of the time period, sending the entitlement or revocation message by the network device to the client device over the connection initiated by the client device, and disconnecting from the client device;
 in response to the receipt of the entitlement or revocation message is positively acknowledged, removing the client device from a multicast list of client devices;
 in response to the client device fails to initiate a connection and receive the entitlement message within the time period, performing at least one retry attempt comprising sending another request for a connection; and
 in response to after the at least one retry attempt the client device fails to receive the entitlement message within at least another time period, performing a revocation failure action.

10. The non-transitory computer-readable storage medium of claim 9, wherein failure to receive the entitlement message is determined based on failure to receive an acknowledgment message.

11. The non-transitory computer-readable storage medium of claim 9, wherein receipt of the entitlement message is determined based on receipt of an acknowledgement message.

12. The non-transitory computer-readable storage medium of claim 11, wherein the acknowledgement message further comprises at least one of a nonce, a hash value, or a digital authentication message.

13. The non-transitory computer-readable storage medium of claim 9, wherein the failure action further comprises at least one of performing a network analysis to determine if a network failure is detected.

14. A method for managing access to content over a network, comprising:
 broadcasting by a network device a notification over the network indicating an availability of an entitlement message for the client device, wherein the client device is situated on one side of a network address translation (NAT) device, and the network device is on another side of the NAT, and wherein the entitlement message is associated with access to content;
 determining a time period for the client device to respond to the notification, wherein a length of the time period is based on at least one of a network characteristic, an urgency of the notification, or a round trip time (RTT) for communication between the network device and the client device; tuning the length of the time period for the client device to respond based at least on historical failure data;
 in response to the broadcast notification the client device initiates a connection with the network device prior to expiration of the time period, sending the entitlement or revocation message by the network device to the client device over the connection initiated by the client device, and disconnecting from the client device;
 in response to the receipt of the entitlement or revocation message is positively acknowledged, removing the client device from a multicast list of client devices;
 in response to the client device fails to receive the entitlement message within the time period, performing at least one retry attempt comprising sending another request for a connection by the network device; and
 in response to after the at least one retry attempt an acknowledgement message is undetected from the client device within at least another time period, performing a revocation failure action.

15. The method of claim 14, wherein sending the notification further comprising using a multicasting protocol to send the notification.

16. The method of claim 14, wherein the revocation failure action further comprises preventing access to at least a portion of content that is encrypted based on an encryption key by employing a different encryption key to encrypt the at least portion of the content.

17. The method of claim 14, wherein upon receiving the entitlement message over the client initiated connection, terminating the client initiated connection.

18. A system for managing access to content over a network, comprising:
 a network device sending encrypted content over the network to a client device; and
 another network device that performs actions, including:
  broadcasting a notification over a network indicating an availability of an entitlement message for the client device;
  determining a time period for the client device to respond to the notification, wherein a length of the time period is based on at least one of a network characteristic, an urgency of the notification, or a round trip time (RTT) for communication between the other network device and the client device;
  tuning the length of the time period for the client device to respond based at least on historical failure data;
  in response to the broadcast notification the client device initiates a connection with the network device prior to expiration of the time period, sending the entitlement or revocation message by the network device to the client device over the connection initiated by the client device, and disconnecting from the client device;
  in response to the receipt of the entitlement or revocation message is positively acknowledged, removing the client device from a multicast list of client devices;
  in response to the client device fails to receive the entitlement message within the time period, performing at least one retry attempt comprising sending another request for a connection; and
  in response to after the at least one retry attempt an acknowledgement message is undetected from the client device within at least another time period, performing a revocation failure action.

19. The system of claim 18, wherein the time period or the other time period are determined, in part, based on analysis of historical acknowledgement failure data for the client device.

20. The system of claim 18, wherein the acknowledgement message further comprises data useable to determine if the acknowledgement message is from the client device.

21. The system of claim 18, wherein the network device and the other network device are the same network device.

* * * * *